May 12, 1931. L. E. M. C. DAHLBERG 1,804,825
MEANS ON FIREARMS FOR MEASURING ANGLES IN THE FIELD
Filed Feb. 12, 1930
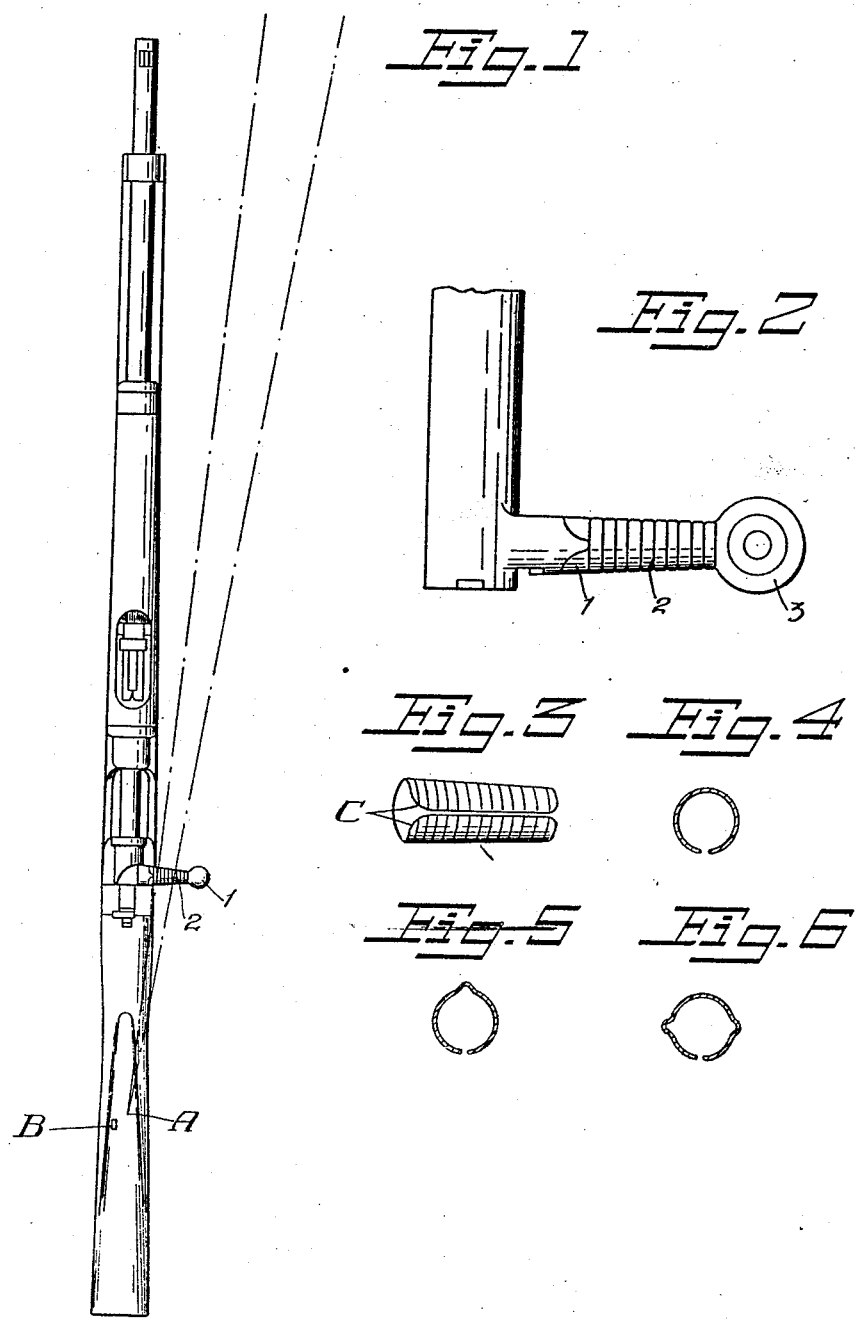
INVENTOR
Lars Erik Martin Clementsson Dahlberg.

Patented May 12, 1931

1,804,825

UNITED STATES PATENT OFFICE

LARS ERIC MARTIN CLEMENSSON DAHLBERG, OF KRISTIANSTAD, SWEDEN

MEANS ON FIREARMS FOR MEASURING ANGLES IN THE FIELD

Application filed February 12, 1930, Serial No. 427,907, and in Sweden July 20, 1929.

This invention relates to means on firearms for measuring angles in the field.

The modern tactical practice demands great accuracy and rapidity in indicating the object and in reporting about the same. It is, however, very often rather difficult to indicate an object rapidly and accurately. An officer with a field-glass detects a dangerous object that ought to be as soon as possible fired at, but which is invisible to the soldiers. An indication by, for instance, a number of finger-breadths right or left from a certain object in the field, easily indicated, as heretofore has been the usual method, does not give sufficient accuracy. Such an accuracy is still less obtained through estimating the angle solely by the eye. Measuring with breadths of the fore-sight gives often too short measure, measuring with breadths of the breech-sight is laborious and tedious as in most cases the sight must be first adjusted for measuring and then readjusted to its position for firing, and there is a great risk that the readjustment is not done properly or altogether forgotten. Moreover the fore-sight as well as the breech-sight hides to a certain degree the field in which the object is situated, whereby the measuring becomes less accurate. All these methods entail also the risk of the soldier becoming, when measuring, visible to the enemy.

Methods, where frames on the arms, capable of being turned laterally, are used, have been tried, but they are tedious and furthermore alter, at least on rifles and carbines, the ballistic properties of the arms and decrease thereby the chance of hitting.

Furthermore many of the above mentioned methods are not practicable at faint light, for instance when the shooter stands under cover in a rifle-protection or lies in dark shadows.

The present invention refers to means on fire-arms, particularly such ones having a breech-block provided with a handle capable of being turned laterally, which means render it possible for the shooter to determine lines of sight in the field with certain angles relatively to indicated lines of sight and further to determine angles between different lines of sight in horizontal and vertical directions. The shooter will by these means be able, first to determine and to report to others readily and rapidly where in the field, for instance, a new-detected, difficultly indicated object is to be found relatively to a certain, readily visible object, and second to determine rapidly and accurately where in the field an object is to be found in relation to an indicated, readily visible object and aim accordingly at this new object, without the shooter wanting to leave or alter his position or make any special manipulation. Thus the shooter can perform the measuring with said means even with the head and the arms in shooting position.

The invention is mainly characterized by the fact that the handle of the breech-block is provided with a graduation for measuring angles in vertical or horizontal or both horizontal and vertical directions. The expression "measuring angles" is, thus, in this connection understood to comprise measuring and determining angles between different lines of sight as well as determining a line of sight having a previously determined angle relatively to an indicated line of sight.

On the accompanying drawing an embodiment of the invention is illustrated. Fig. 1 shows in plane a rifle on which the invention is applied. Fig. 2 shows on a larger scale a part of the breech-block with its handle. Fig. 3 shows in full scale a special sleeve, on which the graduation is applied. Fig. 4 is a cross-section of this sleeve. Fig. 5 and Fig. 6 show cross-sections of special embodiments of the sleeve.

On the handle 1 of the breech-block a graduation or scale 2 is applied that may consist of a number of lines going round the handle, arranged at certain relative distances so that they represent definite angles when seen from the eye of the shooter. In Fig. 1 the position of the eye of the shooter is indicated at A, the cheek-bone rests thereby against the stock at B. Instead of arranging the graduation directly on the handle, it may be arranged on a special sleeve that is put on the handle, for instance a split sleeve of any springy material, suitably celluloid or other transparent material, as dark or coloured lines will on such material stand out sharply at the upper and the lower edges of the sleeve. In-falling rays of light are namely reflected upwards by the handle of the rifle through the transparent sleeve and are intercepted by the upper edge of same whereby the lines will stand out sharply. The lines will appear still sharper if the sleeve is made with a thicker edge, for instance by providing same with one or more longitudinal ridges according to Fig. 5 and Fig. 6, respectively, instead of making it fully symmetrical. The ridge will, especially at faint light, cause the lines to show through and stand out sharply on a somewhat longer part of their lengths. This causes that the said means are of service for a longer time than it is possible to use the sighting-means of the weapon during decreasing light. By the indicated roundings C at the wider end of the sleeve the putting on of the sleeve on the handle is facilitated. The lines may be applied inside the sleeve instead of outside same, in which case the colouring material, when such is used, is better protected. To prevent reflection in strong sunlight the sleeve may suitably be made with wholly or partly dull surface, for instance on half the circumference, which part may then be turned upwards as occasion requires.

Instead of such a sleeve a number of free rings may be used, each ring corresponding to one or more divisions on the graduation. Another modification is that the handle is wound spirally with a strip, ribbon or the like, the width of which corresponds to one division. The rings as well as the sleeve may be made of transparent material, whereas the spirally wound strip shall be made of steel or other resistant, springy material.

The ball 3 of the handle may also be provided with a graduation, for instance for measuring angles in vertical direction when the handle is kept horizontal, or measuring lateral angles, respectively. when the handle is kept upright. This graduation may consist of circles which in the horizontal position of the handle go horizontally or vertically round the ball and are arranged at suitable relative distances.

In the horizontal position of the handle, as shown on the drawing, the shooter can determine angles in horizontal direction by the aid of the graduation 2 and angles in vertical direction by the aid of the graduation on the ball 3 if the ball is provided with horizontal circles. With the handle upright the graduation 2 can be used for determining angles in vertical directions and the graduation on the ball 3 for determining angles in horizontal directions, provided that the ball has the indicated arrangements of the circles.

In order to make it easier for the shooter to place his eye in the correct position relatively to the graduation on the handle of the breech-block, the rifle may suitably be provided with a mark on the butt-end at the point B where the shooter shall place his cheek-bone when measuring. The mark is preferably made in such manner that it can be felt when in contact with the cheek, and may consist of, for instance, a score, a protuberant point or a piece of metal or the like. If a piece of metal is used, for instance a nail head or the like, it will be felt cooler than the surrounding wood of the stock when in contact with the cheek. By such a mark it is attained that the starting point of the lines of sight will always be the same. If then the graduation on the handle or the sleeve is carried out with differently coloured lines to facilitate the distinguishing of them apart from each other, great accuracy is obtained in measuring and confusions and mistakes are prevented as far as it is possible. If a spirally wound strip is used instead of a split sleeve the strip should preferably be coloured differently in sections so that each differently coloured section corresponds to one division.

With fire-arms having a horizontal handle not capable of being turned laterally, the measurings are executed in the same manner as mentioned above when the handle is directed horizontally.

The advantage of the means according to the invention is most easily illustrated by the following description how it is to be applied. One starts from an object distinctly visible to the indicator as well as to the shooter, for instance a tree, a corner of a house or the like. The indicator says for instance: The tree, right 60 points, a machine-gun, 500, fire. The shooter places then the breech-sight on 500 meters, aims over the left line on the graduation on the tree, measures on the graduation 60 points and find the line in which he shall search the machine-gun, estimates where on this line he shall locate the 500-m-distance and opens fire. When determining to left one starts from the utmost right point on the graduation. In this example one has gone out from a division in points, usually 6300, on the circle, other divisions as in degrees or the like may, however, be used.

If the handle is turned upright or the rifle is turned so that the handle stands vertically it is also possible to determine lines of sight in vertical directions.

The invention is not limited to rifles which have been mentioned above by way of example only, but comprises the use of the means set forth on any portable fire-arm, and is further not limited to the materials or arrangements herein described.

What I claim as new and desire to secure by Letters Patent of the United States of America is:—

1. A fire-arm having a breech-block provided with a handle and means on said handle for measuring angles.

2. A fire-arm having a breech-block provided with a handle and means on said handle for measuring angles in horizontal direction.

3. A fire-arm having a breech-block provided with a handle and means on said handle for measuring angles in horizontal and vertical directions.

4. A fire-arm having a breech-block provided with a handle and a graduation on said handle for measuring angles.

5. A fire-arm having a breech-block provided with a handle and a graduation on said handle for measuring angles, the graduation being formed by round-going lines on said handle.

6. A fire-arm having a breech-block provided with a handle and a graduation on said handle for measuring angles, the graduation being applied on a sleeve on said handle.

7. A fire-arm having a breech-block provided with a handle and a graduation on said handle for measuring angles, the graduation being applied on a split sleeve of springy material on said handle.

8. A fire-arm having a breech-block provided with a handle and a graduation on said handle for measuring angles, the graduation being applied on a transparent sleeve on said handle.

9. A fire-arm having a breech-block provided with a handle and a graduation on said handle for measuring angles, the graduation being formed by lines on a removable transparent sleeve on said handle.

10. A fire-arm having a breech-block provided with a handle and a graduation on said handle for measuring angles, the graduation being formed by coloured lines on an interchangeable transparent sleeve on said handle.

11. A fire-arm having a breech-block provided with a handle and a graduation on said handle for measuring angles, the graduation being formed by lines on an interchangeable transparent sleeve on said handle, said sleeve having a longitudinal ridge increasing the visiblity of the lines.

12. A fire-arm having a breech-block provided with a handle and a graduation on said handle for measuring angles, the graduation being formed by lines on a turnable transparent sleeve on said handle, said sleeve having a dull surface to prevent reflection of light rays.

13. A fire-arm having a breech-block provided with a handle and a graduation on said handle for measuring angles, the graduation being formed by contact lines between a number of rings placed close together on said handle.

14. A fire-arm having a breech-block provided with a handle and a graduation on said handle for measuring angles, the graduation being formed by a strip spirally wound round the handle.

15. A fire-arm having a breech-block provided with a handle consisting of an oblong part and a ball, and a graduation on said part for measuring angles in horizontal direction, and a graduation on said ball for measuring angles in vertical direction, said latter graduation being formed by lines on said ball.

16. A fire-arm having a breech-block provided with a handle, a graduation on said handle for measuring angles, and means on the stock of the arm for applying the cheek-bone and thereby the eye of the shooter in a correct position relatively to the graduation.

17. A fire-arm having a breech-block provided with a handle, a graduation on said handle for measuring angles, and a marked point on the stock of the arm which point can be felt when in contact with the cheek for placing the eye of the shooter in the correct position relatively to the graduation.

18. A fire-arm having a breech-block provided with a handle, a graduation on said handle for measuring angles, and a piece of metal fixed on the stock for applying the cheek-bone and thereby the eye of the shooter in the correct position relatively to the graduation.

19. A rifle having a breech-block provided with a handle capable of being turned laterally and means on said handle for measuring angles in horizontal and vertical directions.

In testimony whereof I affix my signature.

LARS ERIC MARTIN CLEMENSSON DAHLBERG.